Patented Apr. 25, 1939

2,155,465

UNITED STATES PATENT OFFICE 2,155,465

FLUORESCENT SCREEN FOR CATHODE RAY TUBES

Rudolf Behne, Berlin-Lichterfelde, and Heinrich Hinderer, Berlin-Zehlendorf, Germany, assignors to the firm Fernseh Aktiengesellschaft, Zehlendorf, near Berlin, Germany No Drawing. Application January 21, 1938, Serial No. 186,252. In Germany January 12, 1937

2 Claims. (Cl. 250—164)

At present, sulphides are used preferably as fluorescent substances in cathode ray tubes. However, it has been found that these substances are not very durable and that their fluorescence is impaired in tubes which contain caesium. As a consequence thereof, considerable difficulties were encountered, particularly in image translators. The applicant has found that if proper fluorescent substances, to which an alkaline or alkaline-earthy layer is applied, are used, durable fluorescent screens can nevertheless be obtained which have considerable advantages over even known fluorescent screens. According to the invention, a silicate is chosen as a fluorescent substance, and such a metal is added, for instance, in the shape of a layer. For instance, a cadmium or zinc silicate, or a mixture of both, is applied to the screen carrier; a certain amount of caesium is evaporated upon the screen, and is formed by heat treatment. Hereby a fluorescent screen is obtained which has a black color and renders perfect and high fluorescent effect. The black color of the screen is of advantage because the image appears to be richer in contrast, particularly if it is viewed in not absolute darkness. The amount of caesium can be chosen to be so great that the screen has good conductivity, but is still highly fluorescent.

The high fluorescence of the screen is caused by various influences. The screen possesses greater conductivity because of the addition of metal. Therefore, the electrons are rapidly carried away through the screen and in this manner space charge, which could exist in front of the screen and decelerate arriving electrons, is prevented. Furthermore, caesium and also barium possess a high secondary emission ratio, as is known. The secondary electrons produce additional fluorescence.

According to the observations of the applicant, it is thus possible to produce perfect and durable fluorescent screens also in tubes containing large quantities of alkaline or alkaline-earthy metals, such as, particularly, caesium. This is especially important for tubes with photoelectric cathodes, for instance, image translators, or secondary electron multipliers, in which a multitude of highly emissive electrodes are provided. While so far special measures were necessary when forming caesium electrodes in order to protect the fluorescent screen from the highly volatile alkali metal, these difficulties are eliminated by the use of silicates, such as zinc silicate. Silicates possess the advantage of a greater fluorescent effect over other fluorescent substances, which effect is not impaired by caesium. Furthermore, the inherent disadvantage of calcium tungstate, that it produces blue light, is also eliminated.

We claim:
1. A fluorescent screen for cathode ray apparatus or the like comprising a deposition of a mixture of zinc silicate and cadmium silicate and a coating of an alkaline earth metal thereover.
2. A fluorescent screen for cathode ray apparatus or the like, comprising a deposition of a metal silicate and a coating of caesium thereover sufficient to color said screen black.

RUDOLF BEHNE.
HEINRICH HINDERER.